Jan. 21, 1964 R. H. PETERSON 3,118,961
ELECTRONIC ORGAN WITH AUTOMATIC MEANS FOR PLAYING
CHORDS AND FACILITATING THE LEARNING THEREOF
Filed Dec. 27, 1960 2 Sheets-Sheet 1

INVENTOR.
RICHARD H. PETERSON
BY
Donald H. Sweet
ATTORNEY

INVENTOR.
RICHARD H. PETERSON
BY
ATTORNEY

United States Patent Office 3,118,961
Patented Jan. 21, 1964

3,118,961
ELECTRONIC ORGAN WITH AUTOMATIC MEANS FOR PLAYING CHORDS AND FACILITATING THE LEARNING THEREOF
Richard H. Peterson, 10108 Harnew Road E., Oaklawn, Ill.
Filed Dec. 27, 1960, Ser. No. 78,601
15 Claims. (Cl. 84—1.17)

My invention relates to electronic organs and includes among its objects and advantages ancillary arrangements for facilitating the enjoyable use of the organ, with a bare minimum of playing technique and also to facilitate and give incentive to continued learning, up to and including the complete technique of an accomplished organist, with no hindering or retardation in the acquisition of the necessary skills by reason of the functioning of the expedients used to assist beginners.

Proceeding from the basic and correct premise that it is much easier with an organ than with a piano, to learn enough about the playing of the instrument to be able to enjoy the music produced by a very inexperienced player, many expedients to enhance the performing capability of players of little or no experience have become popular. So far as I am aware these all proceed by providing a series of push buttons or equivalent manually actuated devices adapted to be manipulated simply and quickly to sound a plurality of different musically related tones simultaneously, so that the accompaniment (or chords) customarily needed to provide the background for any melody can be easily produced by pushing the right push button at the right time. Such expedients enable an almost entirely inexperienced person of reasonable ingenuity and muscular coordination to produce passable music after a period of practice amounting to only a minor fraction of that which would be otherwise required.

So far as I am aware, all the equipment so far offered along this line shares the common disadvantage that progress is very rapid up to a certain rather low level of achievement, but the use of the automatic chord mechanisms completely inhibits any progress by the player in learning how to produce the same chords without the automatic assistance, so that a ceiling is reached which is still at a low level, but any attempt to make further progress by abandoning the automatic chords involves achievement at a materially lower level for a substantial period of time until the manual production of the chords is mastered. This obstacle tends to stalemate most purchasers of such equipment and only those who become sufficiently enthusiastic to endure the drudgery of going back to a lower level of musical achievement and working back up again, succeed in transcending the low ceiling imposed by the automatic equipment.

According to the invention, a limited number of automatic chord operations can be obtained at any one time. Also the control of the automatic operation is such as to leave both hands of the operator entirely free and unencumbered.

This, by itself, would accomplish relatively little. But there is also provided automatic means for moving down the keys on the organ keyboard that should be moved down to produce the same identical chord manually that is being produced automatically. This constitutes the keyboard itself, a handy, and effective mechanical guide for manual instruction and training during the use of the organ in actual play. The player's left hand can lie over the keys involved and feel them move down and the fingers are guided by direct physical contact into the positions where the depressed keys are. Thus at the very outset, with the chord or chords sounded automatically, it is possible to produce acceptable and enjoyable simple music, and at the same time give the fingertips of the left hand physical practice in touching the right keys.

The next important step up the ladder is to use the left hand to play the chords already mastered, and assign the automatic accessory equipment to the playing of other different chords, so that more complicated music requiring the additional chords soon comes within the range of the player. In this way, an increasing repertory of hand positions for the left hand to produce all the chords required, even for quite elaborate playing, can be taught while the level of achievement pursues a steady upward path without interruptions.

Even players who have already acquired a substantial degree of skill, can use the automatic equipment, when some new and more difficult piece of music requires some rapid movement of the left hand from one chord to another, and the chords are special and the movement muscularly difficult and new. The player seeking to master this final step in a difficult passage can set the automatic chord equipment to produce the special and difficult chords, and play them with his right foot while his left hand and fingers are partially guided through the special sequence of movements, to accustom them to the new movement.

Figure 1:
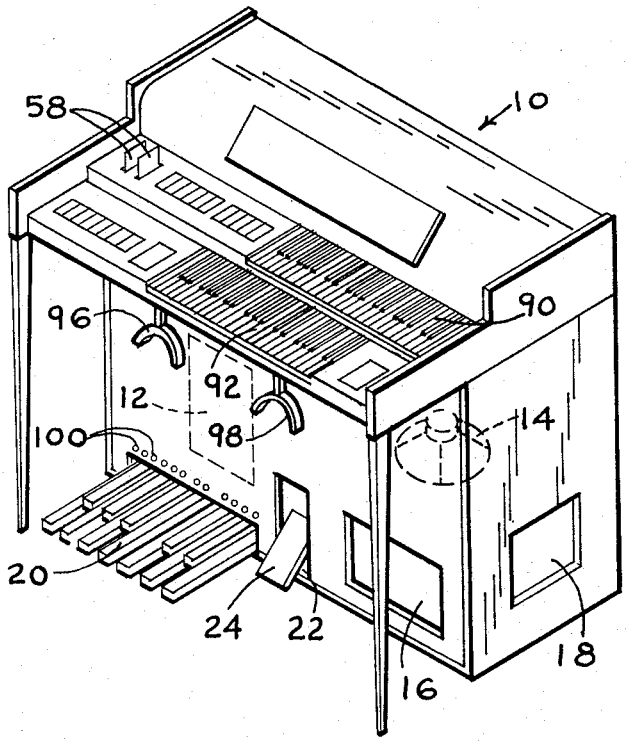
FIGURE 1 is a perspective of a spinet type electronic organ.
Figure 2:
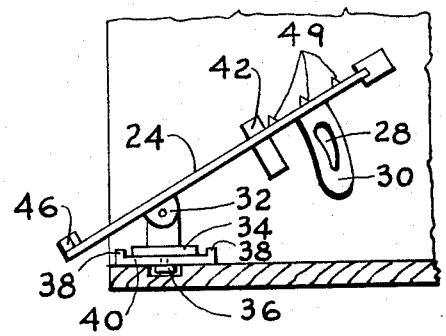
FIGURE 2 is a side elevation, partly cut away, on a larger scale of the expression control pedal.

In the embodiment selected to illustrate the invention, the housing 10 may be of a conventional type, commonly called "spinet." Within it are housed the tone generator 12 and loud speaker 14, generating acoustical sounds that emanate from openings, such as those at 16 and 18. The conventional pedal controls for low notes are indicated at 20 and a front opening at 22 receives a foot pedal 24, commonly called the "expression" pedal. This pedal is held in any position by light friction. The player's right foot may rest on it indefinitely but may be withdrawn for muscular relief or any other reason, without changing the volume adjustment. Moving this pedal down in the conventional way increases the volume of the sound in a suitable way, as by letting a beam of light pass through a tapered slot at 28 on the curved blade 30 projecting downward from the pedal, to vary the amount of light permitted to pass through the slot to a light sensitive device.

Figure 3:
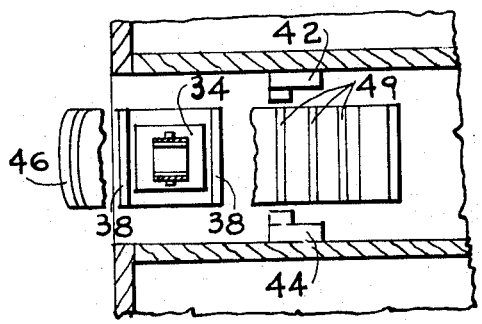
FIGURE 3 is a view, partly cut away, of the same pedal looking down on it from above.

To adapt this single pedal for an additional control, to be secured by letting the operator turn his toe to the right or to the left a slight distance, such as a quarter of an inch, the horizontal pivot at 32 is carried on a platform 34 swiveled at 36 on a vertical axis. The corners of the square platform 34 limit the rotation of the pedal around the axis 36 by striking upturned flanges 38 along the opposite edges of a stationary supporting plate 40 on which the platform 34 rests. At the left of the pedal I position a switch 42 and at the right a switch 44. With the pedal in the position shown in FIGURE 3 neither switch is actuated. The player's heel bears against a check flange 46, and the sole of his foot rests on the corrugations 49 of a rubber tread. A very slight shifting of the toe and pedal to the left will close the switch 42 while a similar movement to the right will close the switch 44. It is impossible to close both 42 and 44 at the same time, but the small lateral shift of the toe is a physical movement that may be performed about as quickly as hand movements are performed in ordinary playing. The necessary muscular skill is easily acquired in a few minutes and become semi-instinctive in a few days.

Figure 4:
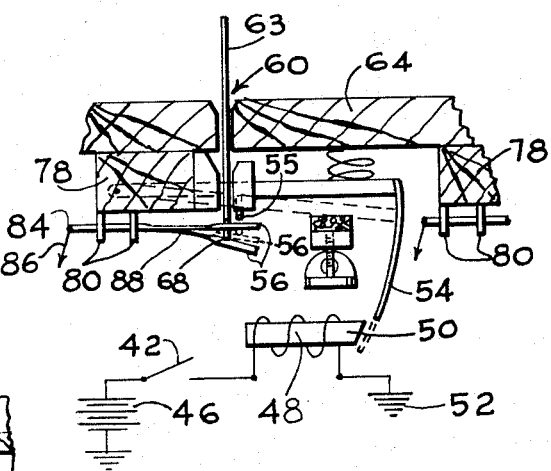
FIGURE 4 is an enlarged partly diagrammatic and partly sectional side view of an automatic selector arrangement according to the invention.

Referring now to FIGURE 4, closure of the switch 42 delivers current from a potential source 46 through the winding 48 of a solenoid having a core 50 and from there back to ground at 52. This will energize the core 50 and move the armature 54 down. Facing the contact bar 55 of the armature 54, which is of conductive material, are resilient contact fingers 56, one for each note to be controlled.

Figure 5:
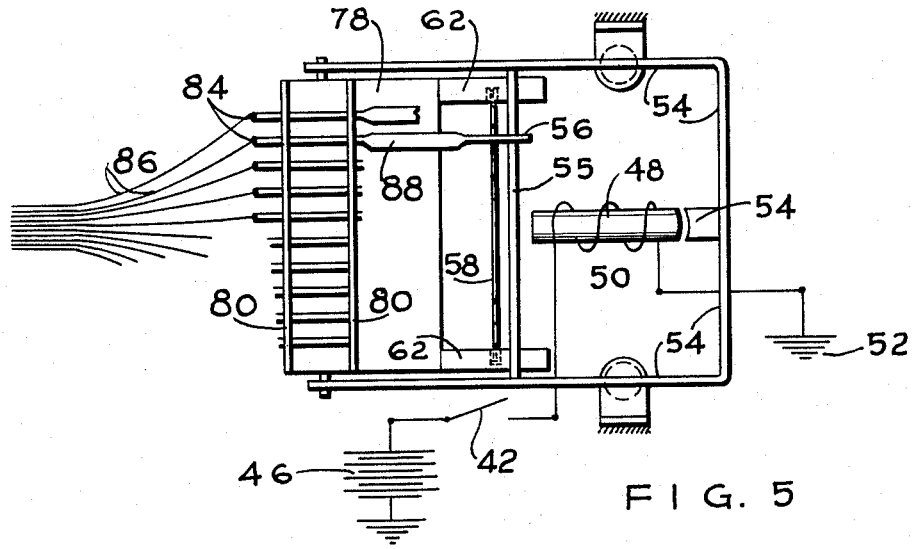
FIGURE 5 is a fragmentary plan view, of the selector, looking up from below.
Figure 6:
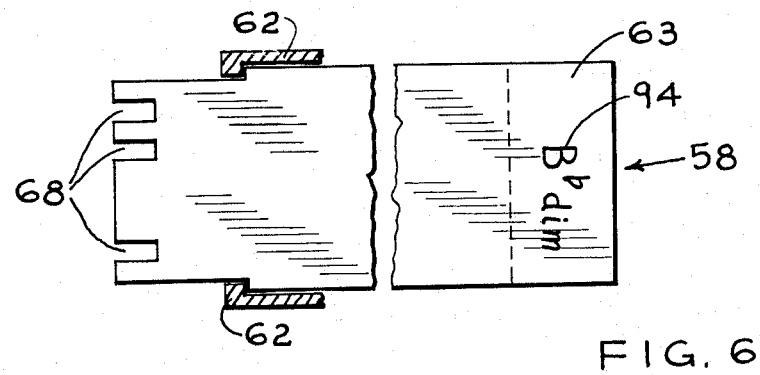
FIGURE 6 illustrates one of the selector cards and the associated corner stops.

It will be apparent that a downward movement of the armature can connect all the contacts 56 for sounding all the corresponding notes. Musically, this would be a grotesque and undesirable result. To eliminate all the contacts 56 except those desired at the time, I provide selectors, one of which is shown in FIGURE 6. The selector 58 of FIGURE 5 is adapted to be inserted in a slot 60 in the housing and rest on corner stops 62 with part of the selector still sticking up at 63 above the housing shelf 64, as indicated in FIGURES 4 and 6, so that the player can easily remove it again. When inserted, its lower edge depresses all the leaf springs 56, except those that register with the selector slots 68 in the lower edge of the card. FIGURE 4 shows one contact 56 undisturbed in one of the slots 68 and an adjacent one pushed down by the edge of the card 58.

Figure 7:
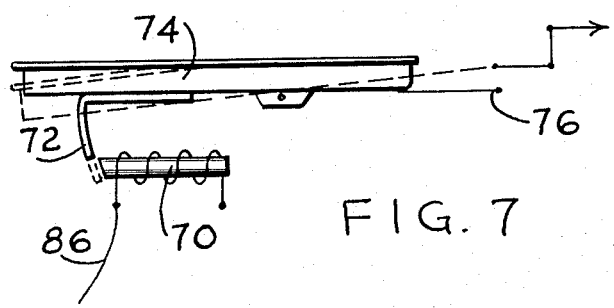
FIGURE 7 illustrates, in side view a simple wiring connection for a playing key.

When the core 50 pulls the armature and contact bar down, the upper contact 56 will be pushed down to the dotted line position of FIGURE 4, and a circuit will be completed for energizing the solenoid 70, of FIGURE 7. This moves the armature 72 and key 74 to the dotted line position and closes the oscillator control switch 76 to energize the oscillator and sound the note.

Each chord unit comprises an insulating block 78, with depending flanges 80, through which the shanks of the contacts pass for support. The butts 84 may be gang-soldered to the individual conductors 86 leading to the solenoids 70. Each contact member is flattened out paper thin at 88 to flex readily.

In FIGURE 1 I have indicated only two complete automatic chord sounding units, but it will be obvious that using more is within the purview of the invention.

With two such units, each conditioned by a different selector card, the player can proceed to play a simple melody on the upper, or solo, manual 90 and use the toe of his right foot to sound the chords corresponding to the cards at appropriate places in the music, which may be conveniently printed on the music furnished. This will cause the keys in the lower accompaniment manual 92 to move down as if the chords were being produced manually by the fingers of the player.

As a player, therefore, the user can achieve a satisfactory rendition of a simple air, relying only on his right toe to sound the chords at the appropriate times. But he also lets his left hand rest on keyboard 92 and feels the lowering of the corresponding keys under his fingertips, which guides his hand through all the motions his hand should perform if there were no foot control available. In this way he not only enjoys the music he is making but he simultaneously trains the fingers of his left hand to play that music without the use of the foot pedal. As soon as the left hand is trained for the two chords involved, the user, as a student, is ready to attempt more complicated music, by removing the cards 58 and substituting other cards to produce two more chords. As indicated in FIGURE 6, each card carries indicia 94 at the top, identifying, in correct musical notation, the chord that it will produce. That makes it easy to file the cards in good order and select and change them quickly. It also develops the player's musical vocabulary.

The player may now proceed to a more difficult musical exercise and play a different melody which calls for the use of four different chords instead of two. Two of these chords he produces by hand because there is no pedal control to produce them and the other two he produces with his right toe and simultaneously puts his fingers in the new positions where the keys are lowered so that his hand is trained to play two additional chords, and to follow the sequence of movements through all four chords.

The time required to master the second set of two chords will be of the same order of magnitude as that required for the first set and the player now has four chords, literally "at his fingertips."

Since a surprisingly large number of common popular tunes can be played without using more than four chords, the student is now the master of a considerable repertory, adequate to have a lot of enjoyment.

It will be apparent that, from this point on, the mastery of the same four chords in other keys requires only the appropriate cards. An unlimited variety of chords in all keys can be made available by cutting cards for them. Subsequent mastery of 6 or 8 chords, and eventually all the chords there are, involves only repetition of the procedure outlined.

While I have illustrated only 12 adjacent keys subject to the foot control, it will be obvious that for more advanced work the range of desirable musical effects can be increased many fold, by having the chord control units embrace 18 or more adjacent semi-tones, so that wider assortments of notes for the same general harmonic effect can be made available to enhance the variety in the accompaniment.

With a range of controlled tones that includes some of the pitches controlled by the pedal clavier 20, it will be obvious that equipment according to FIGURE 7 could be applied to the foot levers 20. However, those are held by relatively stiff springs to help carry the weight of the foot used to depress them, and a much more powerful solenoid would be required. A more significant advantage is obtained by providing a tiny signal light 100 (see FIGURE 1) wired to light up, instead of a solenoid. The advantage resides in the fact that the heel or toe of the left foot is relatively incapable of feeling around to find a displaced pedal lever, but an eye looking down on the manuals 90 and 92 has the lights 100 in the field of peripheral vision, so that sensory control by sight is effective, where feeling is not.

When it is desired to have more than two selector units, the mere multiplication of the units is obvious, but a convenient player control is another matter. In FIGURE 1 I have indicated a left knee-yoke 96 and right knee yoke 98. It will be obvious that each yoke affords player-control for two more switches, but that the sequence of muscular movements necessary for automatic sounding of six different chords becomes about as hard to memorize as the finger movements that liberate the player from servitude to automatic chord playing.

Others may readily adapt the invention for use under various conditions of service by employing one or more of the novel features disclosed or equivalents thereof. As at present advised with respect to the apparent scope of my invention, I desire to claim the following subject matter:

1. In a musical instrument, in combination, tone generating means adapted to generate audible acoustical oscillations of musical quality and of predetermined frequencies corresponding to the notes of the diatonic musical scale; a keyboard; a sounding connection operatively associated with each individual key of said keyboard for controlling musically intermittent delivery of the corresponding musical tone; said sounding connection being rendered operative by manipulation of said key by the player; additional automatic sounding means for intermittently sounding a pre-selected plurality of pre-selected notes simultaneously; and player-controlled actuating means for rendering said automatic sounding means operative and inoperative in musically intermittent sequences, said player-controlled actuating means being positioned to be actuated by a portion of the player's person other than the hands; said automatic sounding means including means for depressing the keyboard keys corresponding to the pre-selected notes.

2. A combination according to claim 1 in which said automatic sounding means is connected to depress the keyboard keys corresponding to the pre-selected notes; and the key depression causes the sounding of the note.

3. A combination according to claim 1 in combination with a second automatic sounding means; and player-actuated control means adapted to activate either of said automatic multiple sounding means.

4. A combination according to claim 3 in which said last mentioned player-actuated control means comprises one activator arranged to be displaced by movement of a predetermined portion of the player's person in one direction, and a second activator arranged to be displaced by movement of the same portion in a direction at variance with said first direction.

5. A combination according to claim 3 in which said control means includes two separate channels; and selector means interpolated in each channel for predetermining the pre-selection of the notes to be sounded.

6. A combination acording to claim 5 in which each selector means includes a quickly removable selector, and in combination with an assortment of different selectors for quickly presetting siad selector means for any one of as many different chords as there are selectors.

7. A combination according to claim 6 in which both channels are adapted to receive any one of a single set of selectors.

8. An electronic musical instrument of the type comprising, in combination: a multiplicity of oscillators for generating each semi-tone of the musical scale throughout a predetermined range of frequencies; a source of potential; connections from said potential source to each of said oscillators; a manual having a playing key for each semi-tone; means actuated by each key of said manual for rendering said power source connection to the corresponding oscillator operative when said key is depressed and inoperative when said key is not depressed; transducer means; and connections from all said oscillators to said transducer means, for delivering signal to said transducer means; the combination of a player-actuated control element; automatic sounding means rendered operative by said control element for concurrently sounding a plurality of preselected harmonically related notes; said element being adapted for normal actuation by a portion of the person of the player other than the hands; said automatic sounding means being operatively associated with said control element and with said oscillators and with said potential source.

9. An electronic musical instrument comprising, in combination; a multiplicity of oscillators for generating each semi-tone of the musical scale throughout a predetermined range of frequencies; a source of potential; connections from said potential source to each of said oscillators; a manual positioned to be accessible to the hands of the player and having a playing key for each semi-tone over a predetermined range; means actuated by each key of said manual for rendering operative pre-selected corresponding oscillator means to generate frequencies perceived by a listener to include the desired note; a player-actuated chord control element other than said keys; and automatic sounding means rendered operative by said chord control element for simultaneous sounding of a plurality of notes within the range of the instrument; said automatic sounding means including means for indicating to the player all the notes being sounded.

10. A combination acording to claim 9 including also a pedal clavier positioned to be accessible to a foot of the player; said indicating means being operatively connected to said clavier and to said manual.

11. A combination acording to claim 9 in which said indicating means is arranged to depress the manual keys corresponding to the notes being sounded.

12. A combination according to claim 10 in which said pedal clavier has a tell-tale light adjacent each of its individual pedals, and said indicating means is connected to identify the pedals by lighting up the corresponding tell-tale lights.

13. In an organ including accessories for teaching the playing thereof, a pedal clavier having a plurality of pedals, and means for enabling an inexperienced player to perceive the position of his foot quickly by eye, as well as muscularly; said means comprising a separate tell-tale light adjacent each pedal, and electrical connections activated by depressing said pedal, for lighting the corresponding telltale light.

14. In an organ including accessories for teaching the playing thereof, a keyboard having a plurality of keys; each of said keys having means operatively associated therewith and controlled thereby for sounding the note corresponding to said key; an additional player control element arranged to be displaced by a portion of the player's person remote from the player's hands; automatic multiple sounding means for automatically sounding a plurality of harmonically consonant notes, in the nature of a chord; and an operative connection for rendering said automatic multiple sounding means operative by displacement of said additional control element, leaving the hands of the player unemployed.

15. A combination according to claim 14, in which said chord sounding means includes means for also lowering the corresponding keys of said keyboard; whereby the student can find quickly, with his finger tips, the manual position for sounding the same chord without the automatic sounding means.

References Cited in the file of this patent

UNITED STATES PATENTS

| | | |
|---|---|---|
| 784,457 | Weber | Mar. 7, 1905 |
| 2,645,968 | Hanert | July 21, 1953 |
| 2,986,953 | Armond et al. | June 6, 1961 |